Nov. 27, 1923.

E. B. THOMPSON 1,475,902

FLEXIBLE GEAR ELEMENT

Filed March 17, 1922

WITNESSES:

R. S. Harrison

W. B. Jaspert.

INVENTOR

Edwin B. Thompson

BY

Wesley G. Carr

ATTORNEY

Patented Nov. 27, 1923.

1,475,902

UNITED STATES PATENT OFFICE.

EDWIN B. THOMPSON, OF PITTSBURGH, PENNSYLVANIA, ASSIGNOR TO WESTINGHOUSE ELECTRIC & MANUFACTURING COMPANY, A CORPORATION OF PENNSYLVANIA.

FLEXIBLE GEAR ELEMENT.

Application filed March 17, 1922. Serial No. 544,530.

*To all whom it may concern:*

Be it known that I, EDWIN B. THOMPSON, a citizen of the United States, and a resident of Pittsburgh, in the county of Allegheny and State of Pennsylvania, have invented a new and useful Improvement in Flexible Gear Elements, of which the following is a specification.

My invention relates to flexible gear wheels, more especially to flexible gears employed in the driving mechanism of electric locomotives.

It is among the objects of my invention to provide a gear structure which shall have flexible elements located therein and which shall function to cushion the impact transmitted from the driving member to the gear teeth and from one gear to another when two or more are employed on a common shaft.

It is a further object of this invention to provide a gear design which shall be of simple compact structure, which shall be economical to manufacture and which, because of its compactness, may be substituted for standard gears employed on some types of locomotives.

In a copending application of V. J. Shepard, filed March 17, 1922, Serial No. 344,518, assigned to the Westinghouse Electric & Manufacturing Company, is described a flexible gear wheel having a floating crank-pin support connected to the hub and the gear rim by a plurality of coil springs to cushion the impact of the connecting rods on the crank pins and gear teeth.

My present invention is directed to a gear wheel of a similar type employing a floating crank-pin support connected to the rim and the hub by a plurality of radial leaf springs. This is a simplified structure in that it permits of removing the spring elements without removing any of the gear parts or other portions of the driving mechanism. It is also more compact, being adapted for use in standard locomotive drives.

In the accompanying drawing, constituting a part hereof and in which like reference characters designate like parts, Figure 1 is a side elevational view of a gear wheel formed in accordance with this invention;

Figure 1:
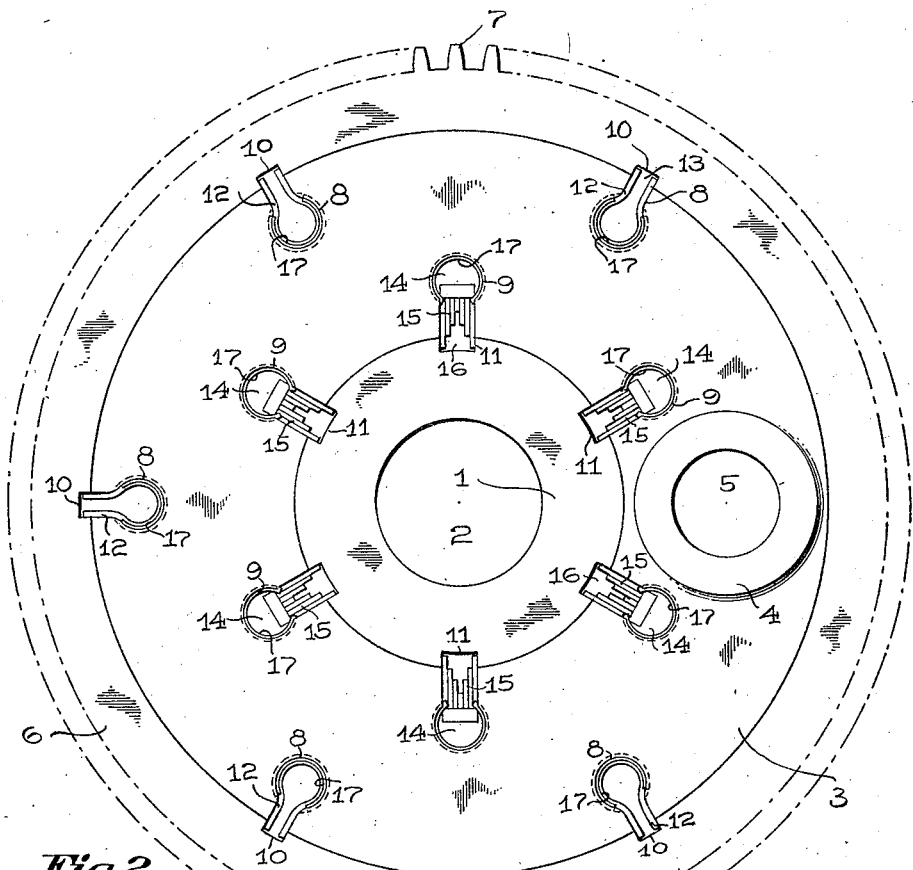

I provide a hub portion 1 which may be an integral part of a locomotive jackshaft 2 or may be mounted thereon in a suitable manner, as by key-seats, set-screws, or the like. A ring 3, having a projecting boss 4 and an annular opening 5 therein adapted to receive a crank pin (not shown), is disposed around the hub 1 to permit rotative movement thereon, and a gear rim 6, having a plurality of gear teeth 7 formed on the outer periphery thereof, is mounted on the ring 3.

The ring 3 is provided with a plurality of radial spring seats 8 and 9 around the outer and inner peripheries thereof, respectively, in alignment with recesses 10 and 11 formed in the rim and the hub, respectively. A plurality of springs 12, having central openings 13, are inserted in the seats 8 and recesses 10, and a plurality of spring nests, comprising annular bases 14 having a plurality of leaves 15 secured thereto, are fitted into the seats 9, with their projecting ends fitting into the recesses 11 of the hub 1. The springs are so assembled as to provide gaps 16 and permit flexing of the members 3 and 4.

The springs 12 (Fig. 2) are held in their seats 8 by a plurality of spring clips 17 which are fitted into grooves 18 formed on the sides of the spring.

Figure 2:
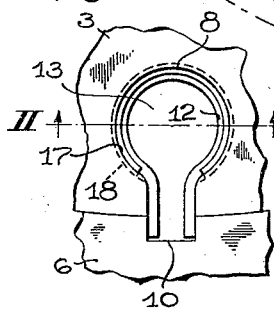
Fig. 2 is a fragmentary view of a section of said gear containing a spring member.
Figure 3:
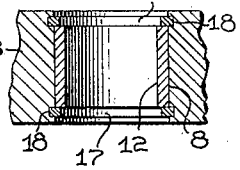
Fig. 3 is a cross-sectional view thereof along the line II—II of Fig. 2.
Figure 4:
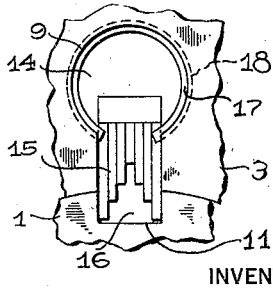
Fig. 4 is a fragmentary view of a section of the gear containing a spring nest.

The spring-nest structure shown in Fig. 4 is held in position by spring clips 17, in a manner similar to that employed in the spring structure of Figs. 2 and 3.

In operation, the torque on the hub tending to rotate the gear produces flexing of the spring leaves which tends to rotate the spring-nest around the axis of the annular base 14, thereby making contact on the opposite leaf which equalizes the stress on the outer leaves.

The springs 12 function in a similar manner, in that the spring tends to move tangentially until the stress is equalized on both of the members projecting into the notches 11.

It will be readily understood from the above description of my invention that gear wheels formed in accordance therewith provide a simple, compact structure and are not as cumbersome as the types employing helical coil springs which require very accurately machined seating surfaces for the spring members to insure equalizing of the tension on the springs, whereas, in my present invention, the springs employed are of a self-aligning type which do not require any special accuracy of fitting to insure a proportionate share of loading to each of the springs. This type of structure further provides a resilient mounting for the crank pin which greatly reduces the wear in the movable parts and allows an appreciable amount of distortion without imparting undue stressing to any of the connecting parts, such as the connecting rods, crank pins, jackshaft, and the like.

Although I have described a specific embodiment of my invention, it will be obvious to those skilled in the art that various modifications may be made in the details of construction without departing from the principles herein set forth. For example, the form and dimensions of one or more of the members which are capable of relative rotative movement and the number, form, dimensions and locations of the springs which cooperate with said members may be varied within considerable limits from what I have specifically illustrated without materially affecting the mode of operation or the result which pertain to the use of my invention.

I claim as my invention:

1. A flexible gear wheel comprising a central hub support, a gear rim and a floating crank-pin support, said crank-pin support being connected to said hub and said rim by a plurality of leaf springs.

2. A flexible gear wheel comprising a central hub support, a gear rim and a floating crank-pin support, said crank-pin support being connected to said hub and said rim by a plurality of leaf springs disposed radially with respect to the axis of said hub.

3. A flexible gear wheel comprising a central hub support, a gear rim and a floating crank-pin support, said crank-pin support being connected to said hub and said rim by a plurality of leaf springs disposed concentrically and radially between said hub, said rim and said crank-pin support.

4. A flexible gear wheel comprising a central hub support, a gear rim and a floating crank-pin support, said crank-pin support being connected to said hub and said rim by a plurality of double-acting radial leaf springs disposed concentrically and radially between said hub, said rim and said crank-pin support.

5. A flexible gear wheel comprising a central hub support, a gear rim and a floating crank-pin support, said crank-pin support being connected to said hub and said rim by a plurality of double-acting radial springs disposed concentrically and radially between said hub, said rim and said crank-pin support.

In testimony whereof, I have hereunto subscribed my name this 10th day of March, 1922.

EDWIN B. THOMPSON.